United States Patent [19]
Jarvis

[11] 3,743,124
[45] July 3, 1973

[54] APPARATUS FOR CONVEYING PIPE LONGITUDINALLY

[75] Inventor: Harold F. Jarvis, Moffat, Ontario, Canada

[73] Assignee: Shaw Pipe Industries Ltd., Rexdale, Ontario, Canada

[22] Filed: Dec. 20, 1971

[21] Appl. No.: 209,574

[52] U.S. Cl.................. 214/338, 118/320, 425/110
[51] Int. Cl............................................. B65h 51/00
[58] Field of Search..................... 425/110, DIG. 50; 134/64, 122, 9, 15; 156/390, 396, 294; 118/302, 307, 320; 214/338, 339, 340, 1 P

[56] References Cited
UNITED STATES PATENTS

| | | | |
|---|---|---|---|
| 3,581,922 | 6/1971 | Versoy............................. | 214/338 |
| 3,664,531 | 5/1972 | Magnusson..................... | 214/339 |
| 3,224,254 | 12/1965 | Loving............................ | 214/338 |

*Primary Examiner*—Albert J. Makay
*Assistant Examiner*—John Mannix
*Attorney*—J. A. Legris

[57] ABSTRACT

In a process in which pipe sections are advanced longitudinally through a treatment zone while being rotated about a longitudinal axis, the pipe sections are supported as they emerge from the treatment zone in a manner which does not damage their treated surfaces. The pipe sections are coupled together by coupling members which provide rigid circumferential support surfaces between adjacent pipe section ends. A shuttle carriage, which can reciprocate between first and second limit positions, has a support assembly which can be raised and lowered into and out of supporting engagement with each successive coupling member to support the coupled ends of a pair of pipe sections over a predetermined distance upon leaving the treatment zone.

13 Claims, 6 Drawing Figures

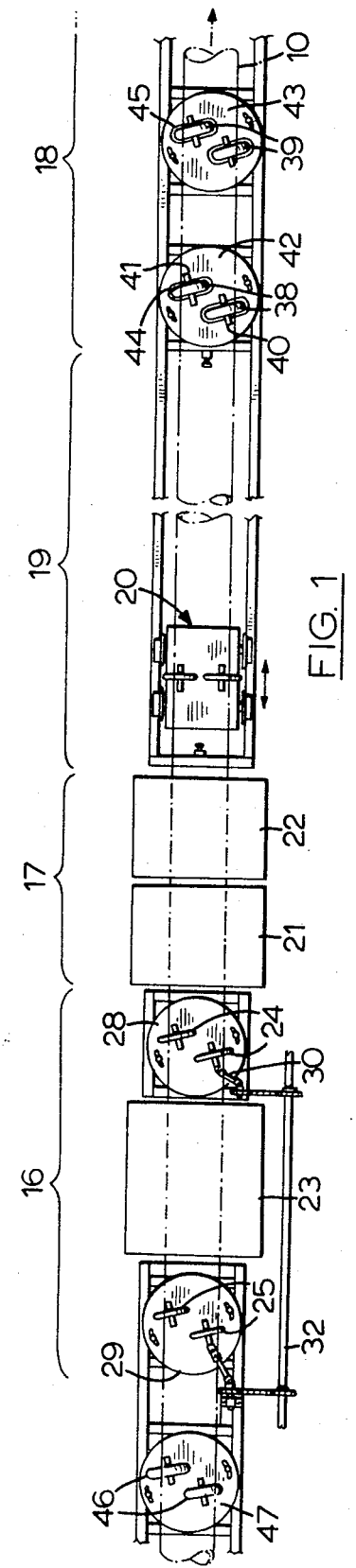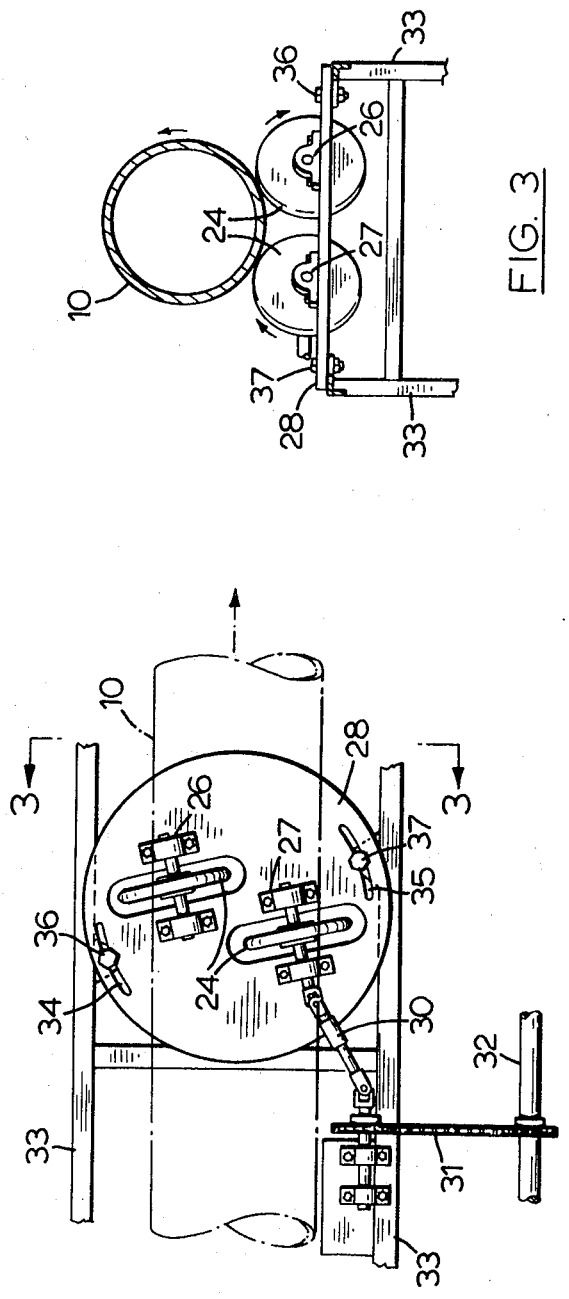

APPARATUS FOR CONVEYING PIPE LONGITUDINALLY

FIELD OF THE INVENTION

This invention relates generally to an apparatus for conveying pipe longitudinally through a treatment zone, for example in the treatment of pipe by applying a curable coating material to its external surface.

BACKGROUND OF THE INVENTION

In copending patent application Ser. No. 036,354, entitled "Method for Thermally Insulating Pipe", filed on May 11, 1970 in the names of Peter M. Maclean, Leslie E. Shaw, and Harold F. Jarvis, there is described a method of forming a tough thermally insulating coating on a pipe by rotating the pipe at a uniform speed about a substantially horizontal axis while spraying a urethane foam mix onto the upper surface of the pipe from a spray nozzle located above the axis, the pipe surface being maintained at a temperature at which the mix constituents will react to form the desired foamed insulation; the spray is traversed along the length of the pipe to build up a uniform layer of polyurethane foam enveloping the length traversed, the polyurethane foam is cured, and finally the coated pipe is sheathed in a layer of tough polymeric material such as high density polyethylene. In the particular method described in the said copending application, individual lengths of pipe are handled separately, each length being individually presented to the coating apparatus and being transferred therefrom in a manner which avoids the need to handle the newly formed coating by which the coating would be damaged. However, the particular method of handling and transferring the lengths of pipe precludes the coating of a number of pipe sections in a single continuous process.

SUMMARY OF THE INVENTION

It is an object of the present invention to provide an apparatus for conveying pipe sections through a treatment zone, for example a coating apparatus, whereby a plurality of pipe sections may be handled in a single continuous process, each pipe section being handled in a manner which is not detrimental to its newly treated surface.

An apparatus according to the invention is adapted to be used with a pipe consisting of a plurality of pipe sections coupled together in end to end relation by means providing a rigid circumferential support surface between each pair of adjacent pipe section ends; such means may comprise coupling members each providing a body portion having a surface constituting said supporting surface, and a pair of opposed axially extending spigot portions adapted to engage frictionally the internal surfaces of a pair of adjacent pipe sections. The apparatus essentially comprises: a feed station disposed adjacent to the treatment zone for feeding the coupled pipe sections thereto, the feed station including a drive assembly adapted to support a pipe section and to rotate the pipe section about its longitudinal axis whilst simultaneously feeding the pipe section axially to the treatment zone; a receiving station aligned with the feed station and disposed to receive successive treated pipe sections from the treatment zone; the receiving station including a support assembly adapted to support pipe sections successively received from the treatment zone while permitting continued rotation and axial advance of the pipe sections, and an intermediate station disposed between the treatment zone and the receiving station.

The intermediate station includes a shuttle carriage adapted to be reciprocated longitudinally between a first position adjacent to the treatment zone and a second position adjacent to the receiving station, means for constraining the shuttle carriage for movement along a predetermined path between the first and second positions, a support assembly mounted on the shuttle carriage, the support assembly being adapted to engage the rigid circumferential support surfaces of said coupling means as the coupled pipe sections are fed through the intermediate station while permitting continued rotation and axial feed of the pipe sections, and means for raising and lowering the support assembly into and out of supporting engagement with the circumferential support surfaces of said coupling means whereby the support assembly is caused to engage the support surface of each successive coupling means at said first position, to remain in supporting engagement therewith until the carriage reaches said section position, and to be disengaged from the supporting surface at the second position.

BRIEF DESCRIPTION OF THE DRAWINGS

One preferred embodiment of the invention is illustrated by way of example in the accompanying drawings, in which:

FIG. 1 is a general plan view of an apparatus according to the invention;

FIG. 2 is an enlarged plan view of a detail of the apparatus, illustrating a portion of a drive assembly;

FIG. 3 is a section on line 3—3 in FIG. 2;

DESCRIPTION OF THE PREFERRED EMBODIMENT

Figure 5:
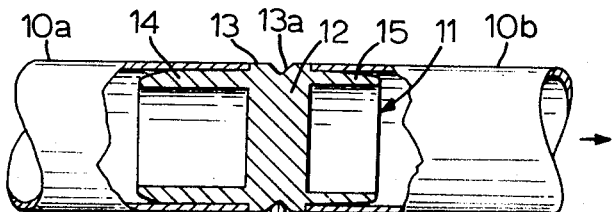
FIG. 5 is a part-sectional view of the shuttle carriage taken on line 5—5 in FIG. 4.

As shown in the drawings, a pipe 10 to be treated is supported horizontally and is advanced longitudinally, that is, in the direction of its axis, through a treatment zone. As best illustrated in FIG. 5 the pipe consists of a plurality of pipe sections, such as 10a and 10b. The pipe sections are coupled together in end to end relation by generally cylindrical metallic coupling members 11. Each coupling member comprises a solid body portion 12 providing a rigid circumferential surface 13, and a pair of opposed, axially extending tubular spigot portions 14, 15. The spigot portions are adapted to engage frictionally the internal surfaces of the respective pipe sections 10a, 10b, so that the latter are coupled together, and the surface 13 forms a support surface disposed between the pipe section ends. It will be noted that the surface 13 includes a circumferentially extending groove 13a of V-section.

Referring now particularly to FIG. 1, the apparatus of the invention comprises a feed station 16 disposed adjacent to a treatment zone 17 for feeding the coupled pipe sections thereto, a receiving station 18 aligned with the feed station 16 and disposed to receive successive treated pipe sections from the treatment zone 17, and an intermediate station 19 including a shuttle carriage 20. The treatment zone 17 is illustrated diagrammatically in FIG. 1 and includes a first region 21 at which a primer is first applied to the external surface of the pipe to be coated, and a second region 22 at which a powdered, heat curable plastic composition is applied to the pipe surface, the pipe surface having first been heated in a heating zone 23 to about 500°F.

The feed station 16 includes a drive assembly adapted to support a pipe section and to rotate the pipe section slowly about its longitudinal axis whilst simultaneously feeding the pipe section axially to the treatment zone 17. The drive assembly comprises a pair of longitudinally spaced, pairs of wheels, 24, 25, whose axes are offset and inclined to the longitudinal direction of feed, the wheels of each pair being longitudinally offset so as to form a cradle for supporting the pipe section.

The wheels of each pair 24, 25 are journalled in respective journal means 26, 27, which are mounted on turntables 28, 29, each turntable 28, 29, being rotatable about a vertical axis for varying the inclination of the wheel axes with respect to the longitudinal direction of feed. One wheel of each pair is connected by an articulated shaft 30, and chain and sprocket drive 31, to a common drive shaft 32.

Each turntable is supported by longitudinally extending side frame members 33, and is formed with a pair of short arcuate slots 34, 35 through which clamping bolts 36, 37 extend to clamp the turntable to the side frame members in a selected orientation with respect to the direction of feed.

The receiving station 18 includes a support assembly adapted to support pipe sections successively received from the treatment zone 17 while permitting continued rotation and axial advance of the pipe sections. The support assembly comprises at least two longitudinally spaced pairs of wheels 38, 39 whose axes are parallel and inclined to the longitudinal direction of feed. The wheels of each pair are longitudinally offset so as to form a cradle for supporting the pipe section received. The wheels of each pair are journalled in respective journal means 40, 41 which are mounted on longitudinally spaced, turntables 42, 43, each turntable being rotatable about a vertical axis for varying the inclination of the wheel axes with respect to the feed direction. The wheels 38, 39, are provided with pneumatic tires which are partly immersed in water baths 44, 45 carried by the respective turntables, the water serving to prevent overheating of the tires. A similar pair of inclined wheels 46 mounted on a turntable 47 prior to the feed station 16 are provided with pneumatic tires. The wheels 24, 25 of the drive assembly however, which engage the pipe in the vicinity of the heating zone 23, where rubber tires would be unusable, are steel rimmed.

It will be appreciated that the longitudinally spaced turntables 47, 29, 28, 42 and 43 are all similarly oriented in accordance with the desired speed of rotation and axial advance of the pipe. By varying the orientation the speed of axial advance, for a given rotational speed, can be varied.

The shuttle carriage 20 is adapted to be reciprocated between a first position adjacent to the treatment zone 17 and a second position adjacent the receiving station 18. The carriage 20 is mounted on wheels 50 which engage track rails 51 defining a predetermined path between the first and second positions. The carriage is connected to a motor driven winch 52 by a tow cable 53, whereby the carriage may be driven unidirectionally from the second position to the first position. A first control switch 54 at said first position is engaged by a stop 55 on the carriage when the carriage reaches the first position, the control switch 54 being operated to de-activate the motor driven winch 52. A second control switch 56 at the second position is operated when the carriage reaches the second position, the operation of the second control switch causing the motor driven winch to be re-activated.

Figure 4:
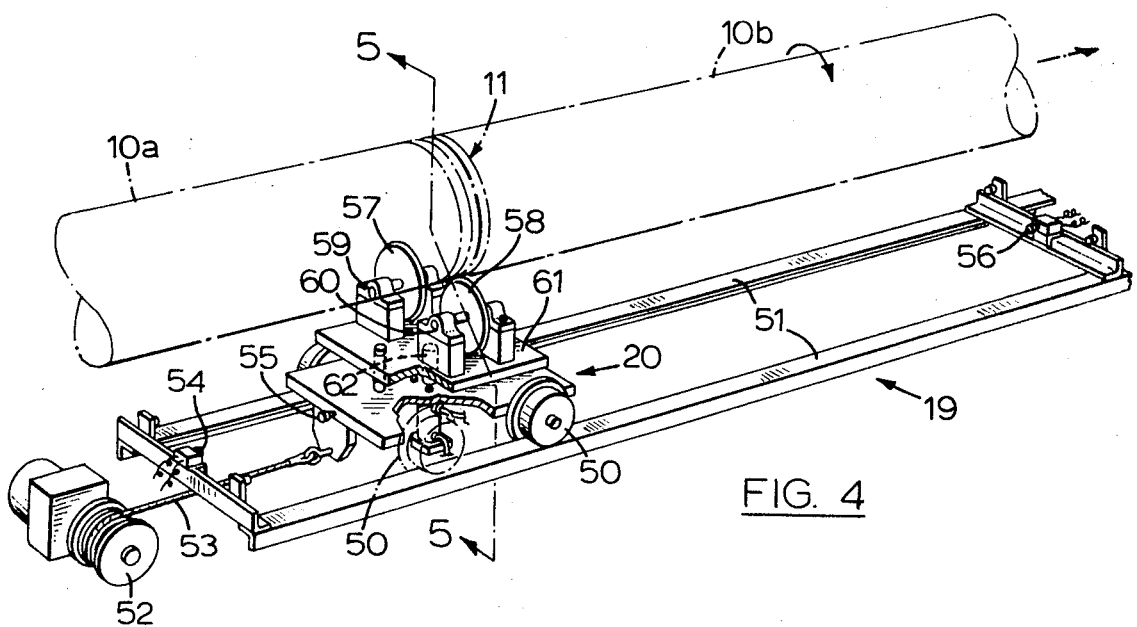
FIG. 4 is a perspective view, partly broken away, of the intermediate station of the apparatus.

Mounted on the shuttle carriage 20 is a support assembly comprising a pair of idler wheels 57, 58 and respective journal mounting means therefor 59, 60. The axes of the idler wheels 56, 57 are parallel and extend longitudinally, and the wheels are laterally aligned so as to engage in a circumferential groove 13a of a coupling member 11 (see FIGS. 4 and 5) and provide a support cradle for the coupling member. The wheels of the support assembly are mounted on a platform 61 which can be raised and lowered with respect to the frame of the carriage 20 by means of a lifting ram 62.

In operation of the apparatus, a long length of pipe 10, consisting of a plurality of pipe sections coupled together in end to end relation by coupling members 11, is advanced longitudinally through the treatment zone 17 where a coating of thermally insulating material is applied to the external pipe surface, for example by the method described in the afore-mentioned patent application Ser. No. 036,354. Each section of pipe is in turn advanced to the feed station 16, where the section is supported by the drive assembly 24, 25, the latter being driven at a predetermined speed so as to rotate the pipe slowly while feeding it longitudinally. Every part of the pipe section passes through the heating zone 23 where it is heated to a surface temperature of about 500°F. It should be noted that the solid body portions 12 of the coupling members close the ends of the individual pipe sections, thus enabling each pipe section to be heated quickly without loss of heat by convection to adjacent sections.

As the pipe section advances at a controlled rotational and axial speed it passes through the treatment zone 17, where the coating material is applied to its external surface. The newly coated surface must not be handled mechanically before it is set, for this would result in damage to the coating. Each successive pipe section is therefore handled in the following manner. When the leading end of the pipe section leaves the treatment zone the shuttle carriage 20 is at its first position, adjacent to the treatment zone, for receiving the leading end of the section. The hydraulic ram 62 is operated to raise the support platform 61 of the shuttle carriage, bringing the idler wheels 57, 58 of the support assembly in engagement with the groove 13a of the coupling member at the pipe section end. This end of the pipe section is thus supported and remains supported while the trailing end of the pipe section is supported by the drive assembly 24, 25. As the pipe section continues its longitudinal and rotational movement, the shuttle carriage 20 being in supporting engagement with the coupling member advances with the leading end of the pipe section, the idler wheels 57, 58 idling as the pipe section rotates. Upon reaching the second carriage position, the carriage operates the control switch 56, whereupon the ram 62 is lowered to move the idler wheels out of engagement with the coupling member. The motor driven winch 52 is re-activated, whereupon the shuttle carriage 20 is returned to its first position, and the control switch 54 is operated to de-activate the winch. When the next coupling member reaches said first position, the ram 62 is again raised to bring the idler wheels 57, 58 into supporting relation with the coupling member, whereupon the cycle is repeated. The movements of the shuttle carriage and the movements of the ram 62 may be controlled manually or automatically.

The length of travel of the shuttle carriage is chosen in relation to the speed of pipe advance so as to ensure that the coating applied to the pipe section shall have dried before the pipe section enters the receiving station. At the receiving station the pipe section is supported by the pneumatic tired wheels 38, 39 which do not damage the formed coating. The coating is still hot, of course, and for this reason the tires are maintained at a relatively cool temperature by the water baths 44, 45.

Figure 6:
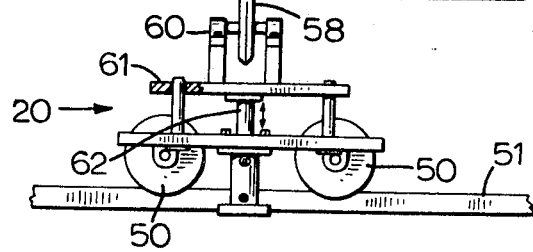
FIG. 6 is a plan view of a detail of a modification.

In the case of a seam-welded pipe the wheels 24 of the drive assembly at the feed station 16 may cause the pipe to jump each time the pipe seam passes over the wheel rims, and so result in the production of an uneven coating that would be undesirable in some applications. In order to avoid this problem the drive assembly may be replaced by the modified drive assembly shown in FIG. 6. FIG. 6 shows a detail of an apparatus which is substantially the same as the apparatus of FIG. 1 but in which the wheels 24 have been replaced by an endless chain 70 which supports the pipe in the manner of a sling. The chain 70 engages sprockets 71, 72, the sprocket 71 being driven from the drive shaft 32. The chain 70 is inclined to the direction of pipe feed as shown, as were the wheels 24. Clearly, if desired, any of the drive assemblies of FIG. 1 may be modified in this way.

It will be appreciated that the invention is not limited in its applications to the coating of pipe with thermally insulating material. The apparatus of the invention may be used in other treatment operations wherein a pipe consisting of a plurality of coupled sections is advanced through a treatment zone, the treated pipe sections being supported as they are received from the treatment zone in a manner which does not injure the treated external surfaces thereof and which does not interrupt the continuity of the treatment process.

What I claim as my invention is:

1. Apparatus for conveying pipe longitudinally through a treatment zone, the pipe consisting of a plurality of pipe sections coupled together in end to end relation by means providing a rigid circumferential support surface between each pair of adjacent pipe section ends, the apparatus comprising:
    a feed station disposed adjacent to the treatment zone for feeding the coupled pipe sections thereto, the feed station including a drive assembly adapted to support a pipe section and to rotate the pipe section about its longitudinal axis whilst simultaneously feeding the pipe section axially to the treatment zone;
    a receiving station aligned with the feed station and disposed to receive successive treated pipe sections from the treatment zone;
    the receiving station including a support assembly adapted to support pipe sections successively received from the treatment zone while permitting continued rotation and axial advance of the pipe sections, and
    an intermediate station disposed between the treatment zone and the receiving station, the intermediate station including:
    a shuttle carriage adapted to be reciprocated longitudinally between a first position adjacent to the treatment zone and a second position adjacent to the receiving station, means for constraining the shuttle carriage for movement along a predetermined path between the first and second positions, a support assembly mounted on the shuttle carriage, the support assembly being adapted to engage the rigid circumferential support surfaces of said coupling means as the coupled pipe sections are fed through the intermediate station, while permitting continued rotation and axial feed of the pipe sections, and
    means for raising and lowering the support assembly into and out of supporting engagement with the circumferential support surfaces of said coupling means whereby the support assembly is caused to engage the support surface of each successive coupling means at said first position, to remain in supporting engagement therewith until the carriage reaches said section position, and to be disengaged from the supporting surface at the second position.

2. Apparatus according to claim 1, said intermediate station including
    i. unidirectional drive means for returning the shuttle carriage from the second position to the first position;
    ii. first control means responsive to the shuttle carriage reaching the first position for deactivating the unidirectional drive means; and
    iii. second control means responsive to the shuttle carriage reaching the second position for re-activating the unidirectional drive means.

3. Apparatus according to claim 2, wherein the carriage is mounted on wheels adapted to run on rails defining said predetermined path, and wherein the unidirectional drive means comprises a motor driven winch connected to the carriage by a tow cable.

4. Apparatus according to claim 2, wherein the drive assembly comprises at least two, longitudinally spaced, pairs of wheels whose axes are parallel and inclined to the longitudinal direction of feed, the wheels of each pair being longitudinally offset whereby to form a cradle for supporting the pipe, respective mounting means for said pairs of wheels, and drive means coupled to one wheel of each pair for rotating the wheels in synchronism.

5. Apparatus according to claim 4, wherein the support assembly at the receiving station comprises at least two, longitudinally spaced, pairs of wheels whose axes are parallel and inclined to the longitudinal direction of feed, the wheels of each pair being longitudinally offset whereby to form a cradle for supporting the pipe, and respective mounting means for the pairs of wheels.

6. Apparatus according to claim 5, wherein the mounting means of the drive assembly and the support assembly each comprise a plurality of longitudinally spaced turntables, each turntable supporting journal means for the respective pair of wheels, and each turntable being rotatable about a vertical axis for varying the inclination of the wheel axes to the longitudinal direction of feed.

7. Apparatus according to claim 6, wherein the wheels of the support assembly are tired and are immersed in liquid baths carried by the respective turntables.

8. Apparatus according to claim 2, wherein the support assembly mounted on the shuttle carriage comprises a pair of idler wheels and respective journal means therefor, the axis of the idler wheels being parallel and extending longitudinally, and the wheels being laterally aligned so as to provide a support cradle for a said coupling means.

9. Apparatus for conveying pipe longitudinally through a treatment zone, the pipe consisting of a plurality of pipe sections coupled together in end to end relation, the apparatus comprising a plurality of coupling members, each coupling member comprising a body portion having a circumferential support surface and a pair of opposed axially extending spigot portions adapted to engage frictionally the internal surfaces of a pair of adjacent pipe sections;

a feed station disposed adjacent to the treatment zone for feeding the coupled pipe sections thereto, the feed station including a drive assembly adapted to support a pipe section and to rotate the pipe section about its longitudinal axis whilst simultaneously feeding the pipe section axially to the treatment zone;

a receiving station aligned with the feed station and disposed to receive successive treated pipe sections from the treatment zone;

the receiving station including a support assembly adapted to support pipe sections successively received from the treatment zone while permitting continued rotation and axial advance of the pipe sections, and an intermediate station disposed between the treatment zone and the receiving station, the intermediate station including:

a shuttle carriage adapted to be reciprocated longitudinally between a first position adjacent to the treatment zone and a second position adjacent to the receiving station, means for constraining the shuttle carriage for movement along a predetermined path between the first and second positions, a support assembly mounted on the shuttle carriage, the support assembly being adapted to engage the rigid circumferential support surfaces of said coupling means as the coupled pipe sections are fed through the intermediate station, while permitting continued rotation and axial feed of the pipe sections, and means for raising and lowering the support assembly into and out of supporting engagement with the circumferential support surfaces of said coupling means whereby the support assembly is caused to engage the support surface of each successive coupling means at said first position, to remain in supporting engagement therewith until the carriage reaches said section position, and to be disengaged from the supporting surface at the second position.

10. Apparatus according to claim 9, wherein the support surface of each coupling member provides a circumferential groove, and wherein the support assembly mounted on the shuttle carriage comprises a pair of idler wheels and respective journal means therefor, the axes of the idler wheels being parallel and extending longitudinally, and the wheels being laterally aligned so as to provide a support cradle for a said coupling member, the laterally aligned idler wheels being engageable in said circumferential groove.

11. In an apparatus for longitudinally conveying pipe consisting of a plurality of pipe sections disposed end to end and interconnected by means providing a rigid circumferential support surface between each pair of adjacent pipe section ends, a feed station adapted to support a pipe section horizontally and to rotate the pipe section about its longitudinal axis whilst simultaneously feeding the pipe section longitudinally, a receiving station aligned with and spaced from the feed station, and an intermediate station disposed between the feed station and the receiving station, the intermediate station including:

a shuttle carriage adapted to be reciprocated between first and second limit positions, means for constraining the shuttle carriage for linear movement along a predetermined path between the limit positions, a support assembly mounted on the shuttle carriage, the support assembly being adapted to engage the rigid circumferential support surfaces of said coupling means as the pipe sections are successively fed through the intermediate station, while permitting continued rotation and axial feed of the pipe sections, and means for raising and lowering the support assembly into and out of supporting engagement with the circumferential support surfaces of said coupling means whereby the support assembly is caused to engage the support surface of each successive coupling means at said first position, to remain in supporting engagement therewith until the carriage reaches said section position, and to be disengaged from the supporting surface at the second position.

12. Apparatus according to claim 2, wherein the drive assembly comprises an endless chain inclined to the longitudinal direction of feed, the chain being supported by sprockets whereby to form a cradle for supporting the pipe, and drive means coupled to one of the sprockets for driving the chain.

13. Apparatus according to claim 9, wherein the body portion of each of said coupling members constitutes a closure for the coupled ends of the pipe sections whereby to prevent the transfer of heat by convection between the pipe sections.

* * * * *